(12) United States Patent
Matthews

(10) Patent No.: US 11,282,048 B1
(45) Date of Patent: Mar. 22, 2022

(54) CARD BASED TRANSFER ACCOUNT

(71) Applicants: Western Express Bancshares, LLC, New Rochelle, NY (US); Steven L Zimmers, Cincinnati, OH (US)

(72) Inventor: Scott Matthews, Windermere, FL (US)

(73) Assignee: Western Express Bancshares, LLC, New Rochelle, NY (US)

( * ) Notice: Subject to any disclaimer, the term of this patent is extended or adjusted under 35 U.S.C. 154(b) by 700 days.

(21) Appl. No.: 15/135,257

(22) Filed: Apr. 21, 2016

Related U.S. Application Data

(60) Continuation of application No. 13/949,949, filed on Jul. 24, 2013, now abandoned, which is a division of application No. 10/154,562, filed on May 24, 2002, now Pat. No. 8,498,932.

(60) Provisional application No. 60/293,257, filed on May 24, 2001.

(51) Int. Cl.
*G06Q 20/10* (2012.01)
*G06Q 20/34* (2012.01)

(52) U.S. Cl.
CPC ....... *G06Q 20/102* (2013.01); *G06Q 20/1085* (2013.01); *G06Q 20/34* (2013.01)

(58) Field of Classification Search
USPC .................................................... 705/35–45
See application file for complete search history.

(56) References Cited

U.S. PATENT DOCUMENTS

| | | | |
|---|---|---|---|
| 4,839,504 A | 6/1989 | Nakano | |
| 5,485,520 A * | 1/1996 | Chaum | G06Q 20/383 705/74 |
| 6,189,787 B1 | 2/2001 | Dorf | |
| 6,213,390 B1 | 4/2001 | Oneda | |
| 6,263,316 B1 * | 7/2001 | Khan | G06Q 20/105 186/35 |
| 6,473,500 B1 | 10/2002 | Risafi et al. | |

(Continued)

OTHER PUBLICATIONS

Authors: Drazen Pasalic ; Vehicle toll payment system based on Internet of Things concept: IEEE Conference Paper; IEEE Xplore;Last Update Date: Aug. 19, 2016; Publication Date: Jun. 1, 2016 Electronic Publication Date: Jul. 28, 2016 (Year: 2016).*

(Continued)

*Primary Examiner* — Alexander G Kalinowski
*Assistant Examiner* — Hatem M Ali
(74) *Attorney, Agent, or Firm* — Wood Herron & Evans LLP

(57) ABSTRACT

The invention contemplates a method of transfer, involving opening one or more trust accounts associated with a plurality of accounts with at least one financial institution, creating a plurality of money account cards with each of the plurality of money account cards associated with a live account associated with the entire amount in the trust account opened and maintained by company with at least one financial institutions, distributing the money account cards to retailers, retailing the money account cards to customers for distribution of the cards to cardholders, receiving money from the customers, applying the money to predetermined accounts of the plurality of accounts, receiving requests from cardholders to access the money in the predetermined accounts, and dispersing funds from the predetermined accounts in response to the requests from cardholders.

14 Claims, 4 Drawing Sheets

(56) References Cited

U.S. PATENT DOCUMENTS

| | | | | |
|---|---|---|---|---|
| 6,538,580 | B2* | 3/2003 | Bostrom | G07B 15/063 |
| | | | | 340/933 |
| 6,615,190 | B1 | 9/2003 | Slater | |
| 6,810,479 | B1 | 10/2004 | Barlow et al. | |
| 7,254,557 | B1* | 8/2007 | Gillin | G06Q 20/102 |
| | | | | 705/35 |
| 8,498,932 | B2 | 7/2013 | Matthews | |
| 2002/0046341 | A1 | 4/2002 | Kazaks et al. | |
| 2002/0077973 | A1 | 6/2002 | Ronchi et al. | |
| 2003/0004828 | A1* | 1/2003 | Epstein | G06Q 20/04 |
| | | | | 705/26.42 |
| 2003/0053609 | A1* | 3/2003 | Risafi | G06Q 20/349 |
| | | | | 379/114.2 |
| 2007/0011060 | A1 | 1/2007 | Karas et al. | |
| 2008/0195541 | A1* | 8/2008 | Battaglini | G06Q 20/10 |
| | | | | 705/43 |

OTHER PUBLICATIONS

Authors: Jin Yeong Tan; Development of a GPS-based highway toll collection system; IEEE Conference Paper: IEEE Xplore; Publication Date: Jan. 1, 2016; Electronic Publication Date: Apr. 5, 2017 Conference Start Date: Nov. 25, 2016 (Year: 2016).*

Authors: Rugnesh Rameshram Kanojia et al.: Secured Vehicle Toll Payment System Using NFC; IEEE Conference Paper: IEEE Xplore: Publication Date: Aug. 1, 2018; Electronic Publication Date: Apr. 23, 2019 Conference Start Date: Aug. 16, 2018 (Year: 2018).*

Bank to offer grocery service card: Gruber, William. Chicago Tribune(1963—Current file) [Chicago, Ill] Apr. 29, 1975:c9.

"Off-Site" Cost Control: Morgan, John B. National Association of Accounts. NAA Bulletin (pre-1986);V-41, Issue-9, [Publication:May 1960].

A Psychometric Model of Supreme Court: Schbert, Glendon. The American Beehavioral Scientist (pre-1986) 5. 3 (Nov. 1961):14.

* cited by examiner

CARD BASED TRANSFER ACCOUNT

CORRESPONDING APPLICATIONS

The present invention is a continuation of U.S. Ser. No. 13/949,949 filed Jul. 24, 2013, which is a divisional of U.S. Ser. No. 10/154,562 filed May 24, 2002, now U.S. Pat. No. 8,498,932, which claims the benefit of U.S. Provisional Application Ser. No. 60/293,257, filed May 24, 2001, all of which are incorporated herein in their entirety.

FIELD OF THE INVENTION

The present invention relates to payment cards used in transfers of payments or expense reimbursements between independent contracting entities.

BACKGROUND OF THE INVENTION

The use of automatic teller machines (ATMs) for personal banking has proliferated in the past decade. Access to funds and account information from any bank or financial institution networked into a particular ATM system is readily available, and ATM locations continue to increase in number. While the electronic management of one's own personal accounts has continued to become more convenient, using these systems to transfer money to another recipient without providing total access to the funds that may be available in the account accessed has lacked in ATM systems.

Instead, the process of wiring money, or sending money through the mail by money order or other commercial paper, remains the primary means for providing the recipient measured or limited access to funds that may be otherwise electronically available. Credit cards, with a predetermined credit limit, may be obtained for a recipient by co-signing or other secured means, but these arrangements may prove difficult to manage so as to limit the amount available for withdrawal or other use by the recipient at a pre-determined level under the credit limit (which may be substantial). In addition, credit cards may not be available to those without an established credit history, without a cosigner or surety, or those with a spotted credit history, such as those emerging from bankruptcy or other financial difficulty.

By way of example, a parent wishing to provide funds for their college student son or daughter living away from home may not want to allow unlimited access to funds in an account or provide a line of credit. Access to an unlimited or high credit line, such as through a credit card, may provide an invitation for abuse, especially for those not accustomed to money management. Limiting these credit lines and available funds to regulate debt incurred necessarily involves the parent delegating some supervising authority to the Credit Card Company, bank or financial institution charged with limiting withdrawals or access.

By way of further example, one wishing to quickly send money to a relative or friend faces similar problems as well as other challenges. Sending checks, money orders or other commercial paper takes time and may incur a hold period, exorbitant cashing and/or transfer costs or require an existing account owned by the recipient in order to redeem. Wiring the money is also expensive and often requires the recipient to visit a specific branch location, which sacrifices the convenience of a withdrawal from a more proximate available ATM.

Difficulties such as these demonstrate that a method and/or system of providing and retrieving money transfers between a customer and recipient through an automated networked method are desirable.

SUMMARY OF THE INVENTION

A method of funds transfer is disclosed comprising the steps of distributing at least one money account card to a retailer, the money account card having information associated with a predetermined account with one or more financial institutions, receiving funds from a customer for allocation to the predetermined account, said customer having purchased said money account card from said retailer, and distributing at least a portion of the funds received to a holder of the at least one money account card selected by the customer.

A method of funds transfer is also disclosed comprising the steps of opening one or more master accounts with at least one financial institution to fund a plurality of accounts, creating a plurality of money account cards with each of the money account cards associated with a customer-loaded dollar amount, distributing the money account cards to retailers, retailing the money account cards to customers for activation and loading the live accounts associated with the cards, and distribution of the companion cards to a second cardholder, receiving money from the customers, applying the money to predetermined accounts of the plurality of accounts, receiving requests from cardholders to access the money in the predetermined accounts, and dispersing funds from the predetermined accounts in response to the requests from cardholders.

The above and other objects and advantages of the present invention shall be made apparent from the accompanying drawings and the description thereof.

Figure 1:
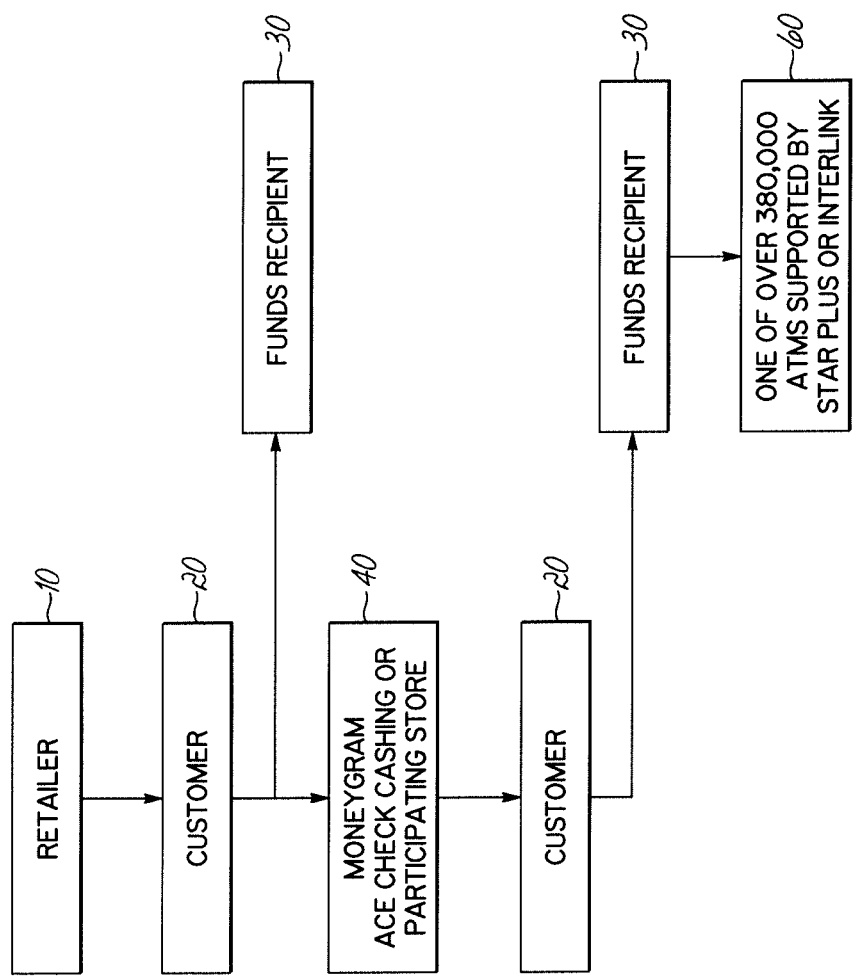
FIG. 1 is a block diagram illustrating a method of money transfer according to the preferred embodiment of the invention.

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

The invention relates to a money transfer method. In its preferred embodiment a provider, which may be a company, individual or other business entity, distributes money account cards to retailers or companies for sale or distribution to customers. Through a retailer or other means, a customer purchases or otherwise receives a money account card tied to an automated money transfer network accessible through an applicable access authorization means. The money account card is usable in a networked financial system, such as an automated teller machine (ATM) network or through participating merchants with Point-of-Sale ("POS") transactions with or without the ability to render cash-back to the customer. The authorization means may restrict access to the network in a number of ways. For instance, information on the money account card may be magnetically encoded, and the money account card package may include a personal identification number (PIN) for retention by the customer. Other access authorizations known in the art, such as PINS and/or passwords accessed through hand held electronic devices such as personal computers, PDAs, cell phones and other communications technologies are also within the scope and contemplation of the invention.

For instance, the customer may receive a card package including a money account card with access authorization means (such as a PIN) to access an ATM network, allowing customer to access a live account associated with that PIN and/or with other information, for instance, magnetically encoded information, that may be available on the money account card. The retailer may charge a fee for the card package. By purchasing or otherwise receiving the card package the customer may access a live account, having a number or other designations that may be listed on the card, which account may immediately credit funds deposited by the customer. The customer may also arrange a credit line, or other options, which are available through the card package provider (hereafter "provider"), and which will be further described herein.

The live individual account associated with and accessible by the money account card is prearranged with the provider, with each account associated with a one or more money account cards that have a common PIN, or other access activation means. These individual accounts may be funded through a master account set up with the one or more financial institutions by the provider or other trust account type of arrangement. The funds in the master account are comprised of the consumer loaded funds into their respective live accounts, or the master account is pre-funded by a merchant, credit union and/or other financial institution. The financial institutions securing the master account are contacted by the provider, who maintains the accounts associated with the money account cards in the name of provider, or through a related company or agent authorized to act on behalf of the provider. Thus, customers do not apply directly to the one or more financial institutions to open their respective account, nor do customers in any way directly interact with the one or more financial institutions. This provides the customer the opportunity to immediately access, load, and utilize the live account, avoiding credit checks, or other prerequisites customer may otherwise have to face when opening accounts thus allowing the provider to maintain the account, expanding or closing it if necessary depending on the actions of the customer vis-a-vis the provider. Alternatively, the provider may require the customer to furnish certain personal information to the provider to, for instance, activate the card, allowing customer then to post a certain monetary amount in the card account and/or to minimize the damages in the event of loss or theft of the money account card. Nonetheless, the provider opens, manages and maintains the account, and is the primary contact for the financial institution, thus easing restrictions that may otherwise apply to a customer seeking to open a traditional account with a financial institution such as a bank.

To effect its management of accounts, the provider may channel funds received from one or more customers into one or more master accounts or secure accounts and then apply the finds as requested or required to a plurality of accounts, where, for instance, each account of this plurality will support one money account card package (which may contain several money account cards). Payment may be provided to the one or more financial institutions where the accounts are kept to reflect administrative costs and other fees with respect to the accounts. Alternatively, given the volume of funds received by the one or more financial institutions through the individual cardholder accounts opened by provider, and the resulting opportunity to invest or loan such funds, the one or more financial institutions may pay a fee to the provider.

The one or more financial institutions may maintain the accounts as they would other personal or corporate accounts, investing or loaning funds, while ultimate responsibility for the accounts stays with the provider to manage and maintain the individual accounts, e-g., open, close or augment them, for instance by requesting credit lines or other options associated and/or offered with the card account, as provider should decide based on requests from customer 20 or pursuant to the occurrence of certain conditions, e.g. customer insolvency or default.

Once the money account cards in the card package are received by a customer, and the PIN, or other access authorization means, is memorized or otherwise retained by the customer, the customer may send one or more of the cards received to a recipient, along with the PIN, or other access authorization means, which may be divulged to the recipient under separate cover, and the recipient will be able to access and receive funds provided by the customer. In an alternative embodiment, the customer may program the card, i.e. through an ATM, or by contacting the provider over the Internet or by phone to request programming the card, or to request a new programmed card, to allow the recipient to exercise pre-determined options apart from withdrawal of funds, i.e. transfer to another sub-recipient, deposit of funds, seek a credit line, use activated features, etc.

At any time before or after the recipient receives the money account card, the customer may deposit money into the account associated with the money account card maintained by the provider with the one or more financial institutions. To reiterate, information identifying the existing account associated with the money account card is encoded, or otherwise displayed or included, on the money account card prior to the customer receiving the card. The deposit may be made at a provider disclosed money deposit or transfer center which may be an office or may be automated such as an ATM or other networked automated terminal or node. This center may also be an outlet otherwise associated with the provider, such as a participating bank, credit union, check cashing location, money wiring location or other similar outlet with which provider has an agreement or other business or financial relationship and that is equipped for money deposit and transfers. These outlets may charge a fee for the deposit that may be a percentage of the deposit, or a flat fee. Using the encoded account information from the card, a money deposit, or other form of commercial paper, preferably those guaranteed such as cashier's checks and money orders, may be directly and immediately credited to the account, and thus become available for withdrawal by the recipient using the money account card received from the customer.

Using the money account card, the recipient may then withdraw funds from any participating ATM source, purchase goods or services from a participating merchant, or withdraw funds from a participating bank, or other similar outlet equipped for money withdrawal. This withdrawal or purchase may be done by accessing the card account using the PIN number provided by provider and the customer, or with an access authorization other than one retained by the customer, which allows limited access to the account and may allow no access to account balance or other information, as decided upon by the customer in, for instance, programming the money account card or otherwise instructing the provider to program the card, as described previously. A fee may be charged to the account for withdrawal by the recipient.

A customer may check account information for the account associated with the money account card using an ATM or by accessing the information online, through for instance a web site accessing account information. The customer may also make phone inquiries to the provider. Using the PIN or other access authorization retained by the customer, all account balance and account activity may be accessed and printed out detailing, for instance, withdrawals, deposits, and other account dispositions. Periodic reports relating to the account may also be sent to the customer by the provider.

Once the money account card is purchased by the customer, according to the preferred embodiment of the invention, the invention contemplates using the purchased or received card package to allow the customer to apply for a credit card or debit card, or otherwise open a line of credit or available funds. A credit line may then be tapped to provide funds for use to transfer to a recipient though the money card method, described as in the preferred embodiment.

Additionally, the customer also has the option to activate a long distance calling feature for a specified amount of long distance calling minutes through one or more telecommunications carrier. To activate this feature, the customer funds the automated account and the provider debits the account for the cost of the feature. The customer, or the recipient, then receives credit for a certain amount of minutes of long distance calling. The customer, or recipient, can push a predetermined number on the telephone receiver while in conversation, and without interruption, customer's account is automatically debited for another block of minutes and customer, or recipient, can continue their conversation.

With respect to the credit line, after the customer purchases and/or receives the card package, and money card therein with PIN, the customer may contact the provider to communicate personal and financial data comprising an application for a credit line. For instance, the manner of communication could be through entry of information on a web site maintained by the provider on the Internet, using, for instance, standard data encoding and communications techniques. The customer may also fill out a self-mailer insert included with the card package or a credit line application and mail this to the provider. Additionally, the customer may call the provider, for instance, through a 1-800 number provided to take credit line applications over the telephone. Other ways of contacting provider and communicating personal and financial data are also within the scope and contemplation of the invention.

The provider receives customer data to process applications for a credit line according to methods and criteria known in the industry. Once the data is received, and placed in the proper format, if necessary, and a sign-up fee, if applied, is received from the customer, the provider forwards the data, electronically, from a database, and/or by paper copy, to one or more financial institutions so they may process the requested credit line, which may be a credit card. The one or more financial institutions then either approve the application and send the customer a credit card, or other credit line instrument, or return the request to the provider to inform the customer of the decision.

Once received, the customer credit line may be electronically tied to the money card account so that the customer may transfer funds and credit between the two sources. Thus, a money card account may be supplemented by, for instance, a cash advance taken on the credit line and automatically deposited, through an ATM for instance, into the money card account.

A database operated by the provider may provide the source for storing data related to both the credit line and the money card account, which would also allow the customer to access either and make transfers between them. For instance, funds held in the money card account could be used to pay outstanding bills on the credit line. Databases providing for storage and retrieval of secure information related to financial information are known in the industry and are accessed through data connections systems known to the art.

The invention also contemplates a method of direct deposit according to one embodiment of the invention. Once a money account card is received or purchased, the customer may request an application be sent to their employer to arrange for direct deposit of payroll or other reimbursement directly to the money card account. The request is received and processed by the provider through an Internet connection, mail insert application, 1-800 number phone contact, and/or in other ways known in the industry. Employer information includes employer name, address and contact person, among other information.

Customer employer information is received by the provider and input into the direct deposit database where it is stored for later access and for records purposes. The provider receives information from the database and sends the employer an application to arrange the direct deposit. The employer completes the application and arranges deposit of the customer payroll directly to money card account, sending a return application or confirmation to the provider. When the return application or confirmation is received, the provider sets up a money card account to receive the direct deposit; this may involve contacting the one or more financial institutions which hold the account associated with the money account card on behalf of the provider and providing instructions allowing the one or more financial institutions to instituted direct deposit from the employer.

Using the same process as the direct deposit, a customer can also provide the provider with employment information, and after verification of the same, the provider can set up a direct deposit account from employer with provider as the recipient of customer designated employment compensation. Once the verification and account are complete, provider can provide a loan to the customer for a certain fee, and provider will load the funds into the card account for customer's immediate access. Instead of the customer receiving his/her next paycheck, the pay amount will be received by the provider.

After the customer purchases and/or receives the card package, the customer can also contact the provider through a 1-800 number provided, or through a self-mailer, and apply for pre-paid local dial tone service for their home telephone. Once the data is received by the provider, and the appropriate amount of funds and fees for the month of service are placed on the card by the customer, the provider debits the card for the local dial tone fee, and then provider contacts the dial tone service who activates customer's telephone with a dial tone. After the initial activation, the customer can elect to have the account automatically debited each month for continued dial tone.

Using the same process as the provision of pre-paid dial tone service, after the initial activation and funding of the card, the customer can also contact the 1-800 number provided, complete a mailer, or visit an approved location, to activate an account for automatic toll payment on major U.S. Highways. Once the customer provides provider with the necessary account information, and the proper funds are loaded onto the card, the customer may order via mail, or visit an installation location or a website to receive an automated toll payment transponder. The customer may elect to have the card account automatically debited each month for continued service.

Also, through the same process as describe above, customer can also arrange to have the account debited to pay for prearranged bills and invoices to participating merchants. The process contemplates that provider arranging transfer accounts to each participating merchant, and upon receiving customer request and authorization for a specified amount of payment due to a merchant, provider will debit the approved amount from the live account, and credit the same amount to the merchant, minus any fees and costs charged by provider and/or merchant in providing customer with the convenience.

In addition, the invention also contemplates a method of Federal Deposit Insurance Commission processing according to one embodiment of the invention. Where the customer requests FDIC insurance of money card account, customer provides personal and financial information to the provider, which information may be provided via the Internet, a paper application filled out and sent to the provider through, for instance, a self mailer insert, or by telephone using, for instance, a 1-800 customer access number. The provider processes the information received and inputs it into the database. The information along with application for FDIC insurance is then forwarded to the one or more financial institutions in which the money card account is kept through provider. The one or more financial institutions then update all relevant accounts for FDIC insurance and maintain records for all active accounts according to instructions received from the provider. The provider may accept responsibility for all lost or stolen cards and will be the primary contact for the customer with respect to the cards or the accounts. Suspension or cancellation of accounts is at the instructions of the provider communicated to the one or more financial institutions.

The cards call also is used as a means by which an employer and/or independent contractor can pay individuals that it owes certain commission payments, and/or expense funds. Where the employer sets up an account with provider and provider assigns designated card accounts to employer. Employer then distributes on or more cards to the employee. When payment is due, upon submission of reimbursement slip, or otherwise, Employer forwards a request to providers via e-mail or other transmission means, and provider transfers the requested funds out of employer's account and into the requested employee account. Upon transfer, the employee can use the funds on the card, either for predetermined designated merchants, or freely at ATMs and/or to make point of sale purchase.

While the invention has been described in response to the above embodiments of the invention, it should be understood that the invention is no limited to these precise embodiments. Rather, many modifications and variations will be present themselves to persons skilled in the art without departure from the scope and spirit of the invention, which is defined in the appended claims.

DETAILED DESCRIPTION OF THE FIGURES

With respect to the Figures, FIG. 1 is an exemplary illustration of the money transfer method of the preferred embodiment. In this, the provider distributes money account cards to a retailer 10. Retailer 10 sells customer 20 at least one money account card, which may be in a closed and sealed package. The package contains a live account with one or more financial institutions and a PIN that relates to the card in the package. Customer 20 opens the package and inspects it to make sure it has not been opened and/or the PIN divulged. Customer 20 then memorizes the PIN code. The customer 20 then sends one of the cards in the package to a recipient 30, whom the customer selects to receive funds distributed through the card. The customer either does not send the PIN number received in the package, or sends a PIN number that either allows limited access to the account, or access to all funds, associated with the money account card.

When customer 20 receives knowledge that the recipient 30 has received the card, the customer 20 may proceed to allocate funds 40 to the account associated with the card, which may be done through, for instance, a bank, ATM, check cashing location, or other outlet or retailer networked, or otherwise in communication with the account, the provider or the one or more financial institutions holding the account. Upon allocation, the recipient 30, having a money account card associated with this account, may receive funds 60 through outlets, including ATMs and other locations, networked, or otherwise in communication with the account. Charges may apply for any allocation or distribution of funds in and from the account.

Upon allocation of the funds, customer 20 may contact recipient 30 to notify them that the funds are available. This notification may be done through a number of communications means, including, e-mail and pager. Customer 20 may also go on-line, for instance, visiting a web site associated with the provider and/or with the one or more financial institutions holding the account, to check if funds are available to recipient 30, and also to check account balances and other account information. Recipient 30, using the money account card and any PIN associated therewith, may withdraw up to the maximum limit set, which maximum may reflect the available funds or a pre-set limit imposed by customer 20, for instance, through instructions given to provider or the one or more financial institutions holding the account.

Figure 2:
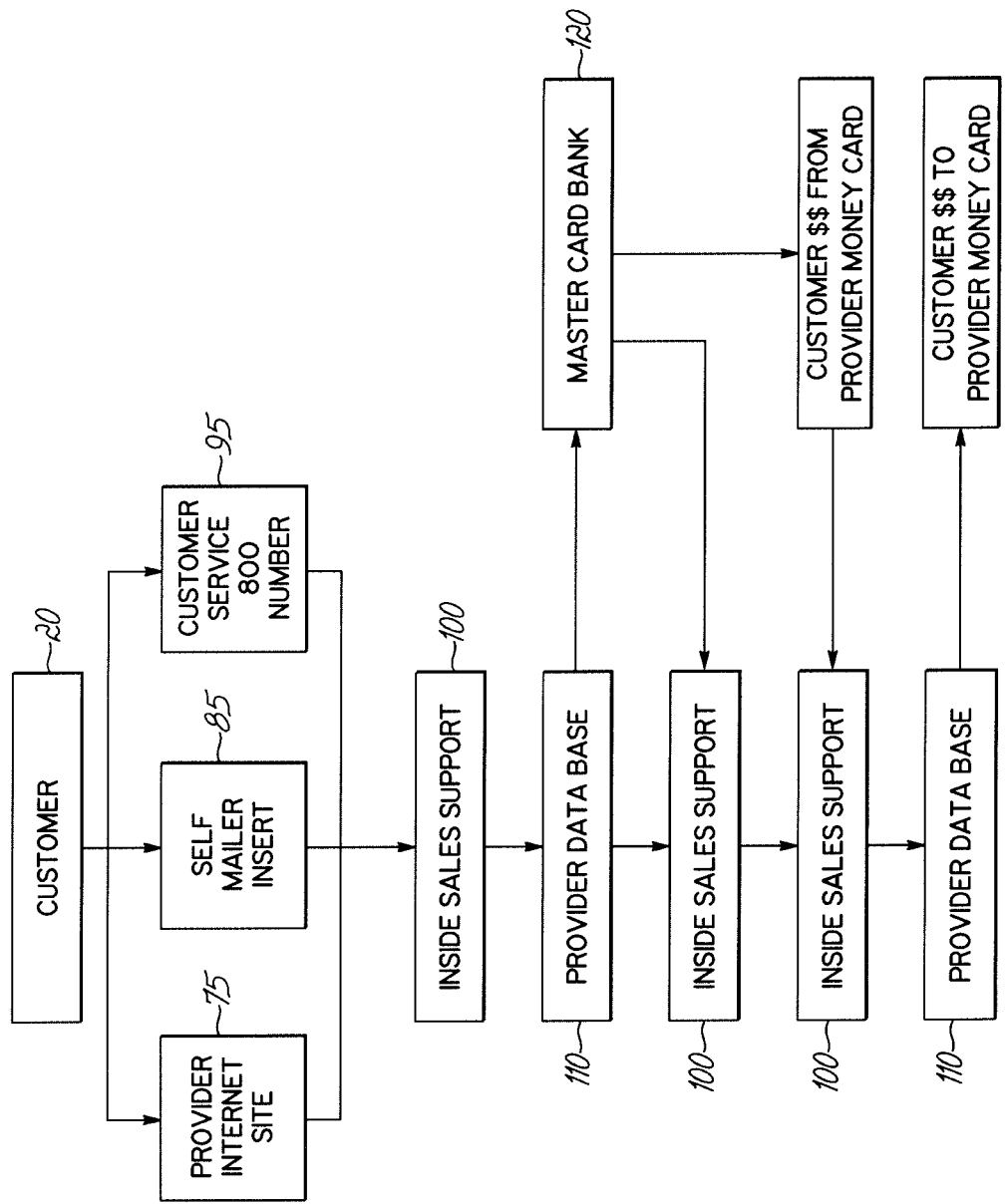
FIG. 2 is a block diagram illustrating a method of card processing according to the preferred embodiment of the invention.

FIG. 2 illustrates an exemplary method of credit card processing according to the preferred embodiment of the invention. As with respect to FIG. 1, customer 20 purchases a card package containing a money account card, but also including a self mailing insert 85 having a form. The self mailing insert 85 form would record information from customer 20 to process an application for a credit card. Alternatively, this information may also be received from customer 20 through information supplied through a web site 75 or through a customer service telephone exchange 95.

Customer information for processing the credit card application is received by provider sales support 100. Sales support 100 determines if the minimum information for processing was present in the application, however supplied, e-g., seeing if all appropriate fields are filled out. The application for credit card would include information gathered by Sales support 100 from either the customer 20 or referred from customer service 95, the Internet 75 or by the self mailer 85 that is in the package at the time of purchase. Sales support 100 enters the information into a database 110. Once the application is received into database 110, the application would then be automatically forwarded to the appropriate financial institution 120 to process the credit card. If all the fields are not filled out correctly or if the customer does not have the available funds, the database would automatically return the application to the sales support 100 for reprocessing.

The financial institution 120 will receive all the appropriate information so they can process the customer's credit card request in a timely manner. When the financial institution 120 processes the new credit card account, it will notify by forwarding an e-mail message or similar communication, to sales support 100 in order to update customer's record. Sales support 100 keeps all accounts pending until a response and confirmation information have been received from the financial institution 120 and updated in database 110. The customer's credit card is sent directly from the financial institution 120 to customer 20.

Sales support 100 is responsible for maintaining all accounts that have not been closed out by the financial institution 120 and updating accounts that have been processed. After sales support 100 receives confirmation on an account, sales support 100 would then forward to customer 20 a congratulations letter and an explanation letter on how to use his or her credit card. Customer 20 has now received his or her new credit card and customer 20 may add credit 125 to their account by transferring funds to their predetermined account associated with the money account card from their credit card. Services support 100 inputs information from the customer into the database 110 so that the database can automatically transfer funds between the accounts associated with the money account card and the credit card. Database 110 processes customer requests for transfer of funds, and determines if funds and/or credit are available. The customer 20 now has a credit card that could be used all over the world, and in almost every retail outlet.

Figure 3:
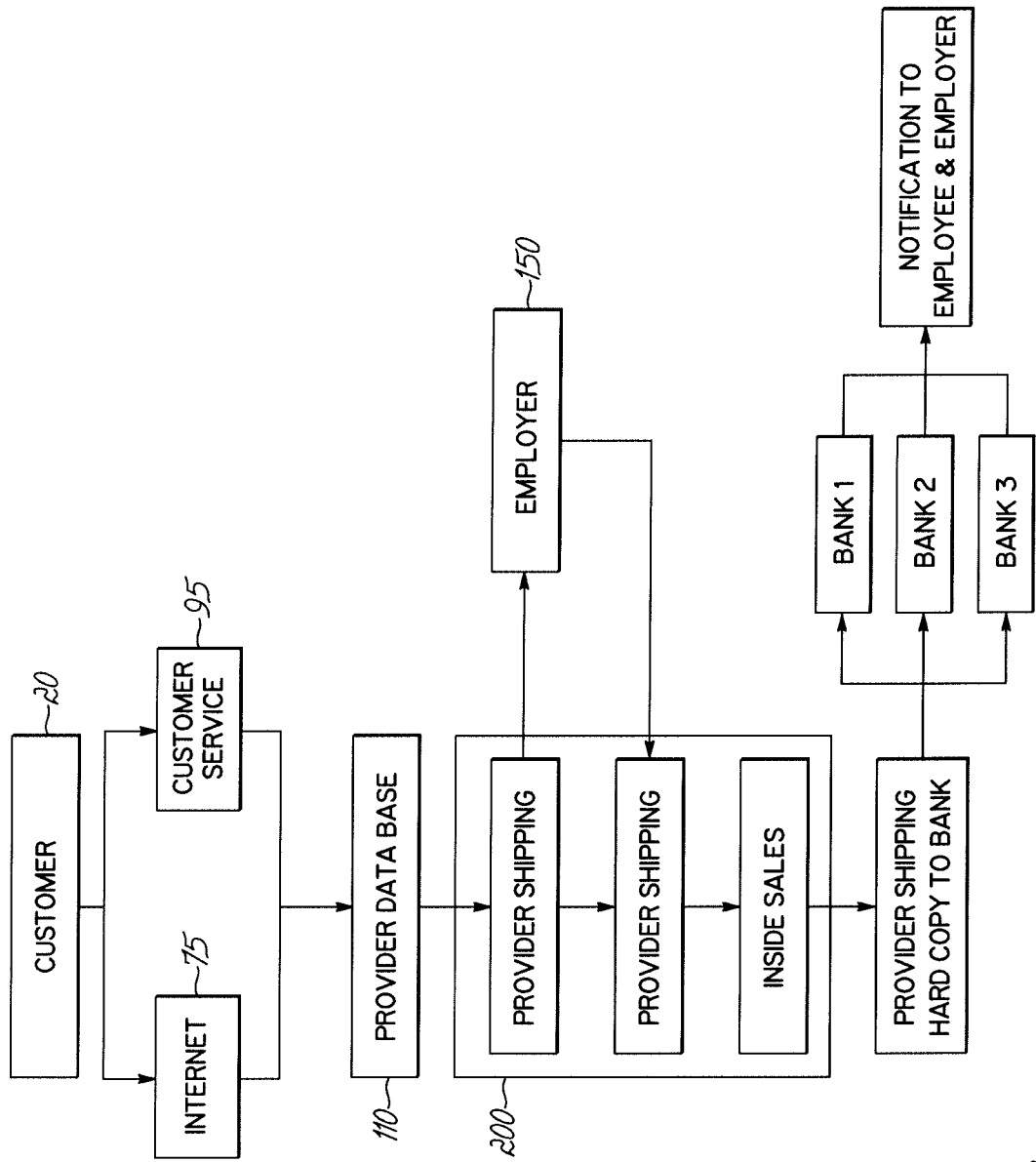
FIG. 3 is a block diagram illustrating a method of direct deposit according to the preferred embodiment of the invention.

With respect to FIG. 3, the direct deposit feature, customer 20 requests an application to be sent to his or her employer via internet or customer service. Customer 20 provides card account number, company name, company address, phone number and contact person, and any other required information, to sales support 100, for instance through the Internet 75 or through customer support 95 in order for database 110 to process the request. Database 110 will initiate a direct deposit request and generate a report 200 to send an application out to the employer 150 to start the employee direct deposit program.

Employer 150 completes the application and sets up employee's payroll to be directly deposited into the customer/employee's account associated with a money account card. The completed application from employer 150 is received and forwarded to sales support 100 for processing. Sales support enters all information received into the database 110 and forwards a hard copy to the Processing Department. Processing Department sends an original hard copy to the bank or financial institution holding the account associated with the money account card and will set up the account to receive the customer's direct deposit. The financial institution will also notify customer 20, for instance by confirmation letter, that his or her account has been set up. The customer will have the ability to use the money account card to distribute funds from his or her account at any participating ATM, and/or make point-of-sale purchases with the card at a participating networked merchant.

Figure 4:
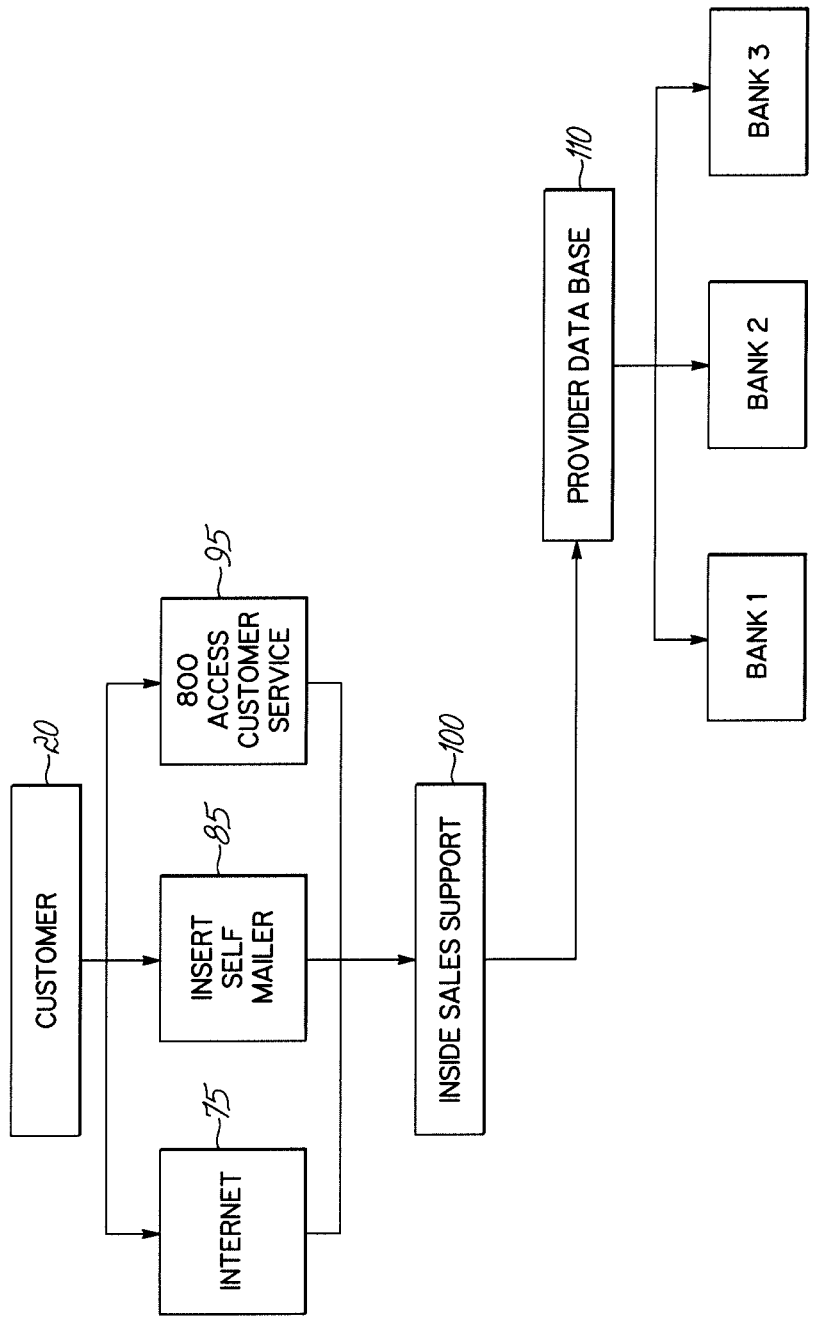
FIG. 4 is a block diagram illustrating a method of FDIC coverage access according to the preferred embodiment of the invention.

With respect to FIG. 4, and the request for Federal Deposit Insurance Commission insurance, customer 20 completes the following information for his or her money card to be FDIC Insured up to $100,000 per account: Name, Address, Telephone Number, and SSN Number. This information is provided either by Internet 75, Self Mailer 85 or through customer support 95 and is received by sales support 100 and entered into database 110. Sales support 100 processes orders received by completing the FDIC Application, for instance, from a desktop menu. Database 110 maintains all customer records and forward all applications to the bank or financial institution holding the account associated with the money account card. The financial institution updates all accounts for FDIC Insurance and maintains records for active accounts.

Not sure we need this paragraph—this is our standard. Similar one appears before heading detailed description of figures. While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of funds transfer performed by a business entity to provide payments and/or expense funds to individuals in a contractual relationship with the business entity, comprising the steps of:
   a. distributing a money account card to an individual, the money account card assigned to a designated card account for the individual;
   b. in response to a payment or reimbursement due to the individual from the business entity, transferring requested funds out of the business entity's account and into the individual's account; the funds transfer to the individual's account occurring independently of any scheduled pay date;
   c. activating the individual for automatic toll payment;
   d. in response to a reimbursable charge incurred by the individual, crediting the amount of the charge to the individual's account;
   e. receiving an authorization from an automated teller machine (ATM) network,
   f. debiting an amount from the individual's card account and
   g. initiating dispensing of cash by an ATM.

2. The method of claim 1 wherein the step of crediting the amount due to the individual to the individual's card account comprises crediting the amount due to the individual's card account less a convenience fee or cost.

3. The method of claim 1 further comprising, in response to approved presentment of a bill or invoice incurred by the individual at a participating merchant, debiting the amount thereof from the individual's card account and crediting the merchant.

4. The method of claim 3 wherein the step of debiting the approved amount from the individual's card account and crediting the merchant comprises crediting the merchant the amount debited from the individual's card account less a convenience fee or cost.

5. The method of claim 1 wherein the step of activating the individual for automatic toll payment is performed in conjunction with individual's acquisition of an automated toll payment transponder.

6. The method of claim 1 further comprising crediting the individual's card account with loaned funds available for immediate access by the individual in anticipation of future earnings expected to be payable to the individual from an independent contractor at a later time.

7. The method of claim 6 further comprising applying earnings payable to the individual toward payment of previously loaned funds.

8. The method of claim 1 further comprising, in response to a charge to the card account by the individual at a merchant, debiting the individual's card account and crediting the amount of the charge to the merchant.

9. The method of claim 1 further comprising debiting the individual's card account with a fee for communications service and crediting the fee to the individual's communications service provider.

10. The method of claim 9 wherein the step of debiting the individual's card account with a fee for communications service and crediting the individual's communications service provider comprises crediting the service provider the amount debited from the individual's card account less a convenience fee or cost.

11. The method of claim 9 further comprising automatically debiting the individual's card account on a monthly basis for continued communications service.

12. The method of claim 1 further comprising automatically debiting the individual's card account on a monthly basis for a designated merchant.

13. The method of claim 1 further comprising suspending or cancelling the individual's card account in the event of loss or theft of the money account card.

14. The method of claim 1 further comprising distributing a second money account card assigned to the card account for the individual.

* * * * *